(12) United States Patent
Adler et al.

(10) Patent No.: US 11,289,125 B1
(45) Date of Patent: Mar. 29, 2022

(54) DIGITAL CONFORMATION OF MEDIA CONTENT

(71) Applicant: Disney Enterprises, Inc., Burbank, CA (US)

(72) Inventors: David M. Adler, Valley Glen, CA (US); Giovanni Colombo, Pasadena, CA (US); Jonathan Hartzberg, La Cañada, CA (US); Colin Smith, Vancouver (CA)

(73) Assignee: Disney Enterprises, Inc., Burbank, CA (US)

( * ) Notice: Subject to any disclaimer, the term of this patent is extended or adjusted under 35 U.S.C. 154(b) by 190 days.

(21) Appl. No.: 16/032,977

(22) Filed: Jul. 11, 2018

Related U.S. Application Data

(60) Provisional application No. 62/622,058, filed on Jan. 25, 2018.

(51) Int. Cl.
| | |
|---|---|
| *G11B 27/031* | (2006.01) |
| *H04N 19/40* | (2014.01) |
| *H04N 21/854* | (2011.01) |
| *H04N 21/8543* | (2011.01) |

(52) U.S. Cl.
CPC .......... *G11B 27/031* (2013.01); *H04N 19/40* (2014.11); *H04N 21/8543* (2013.01); *H04N 21/85406* (2013.01)

(58) Field of Classification Search
CPC ................ G11B 27/031; H04N 19/40; H04N 21/85406; H04N 21/8543
See application file for complete search history.

(56) References Cited

U.S. PATENT DOCUMENTS

| | | | |
|---|---|---|---|
| 2007/0109305 A1* | 5/2007 | Tak | G06T 13/20 345/473 |
| 2007/0260632 A1* | 11/2007 | Parsons | G06F 16/958 |
| 2011/0188770 A1* | 8/2011 | Weinberger | G06K 9/40 382/255 |
| 2014/0237365 A1* | 8/2014 | Oberbrunner | G06F 3/04847 715/722 |
| 2015/0363503 A1* | 12/2015 | Scheuerman | G06F 40/134 715/202 |
| 2017/0345130 A1* | 11/2017 | Wang | G06K 9/66 |
| 2018/0152737 A1* | 5/2018 | Mathur | H04N 21/234 |
| 2018/0197202 A1* | 7/2018 | Biswas | H04H 60/37 |
| 2019/0089861 A1* | 3/2019 | De Mers | G06T 11/60 |

* cited by examiner

*Primary Examiner* — Mishawn N. Hunter
(74) *Attorney, Agent, or Firm* — Farjami & Farjami LLP

(57) ABSTRACT

According to one implementation, a media content conformation system includes a computing platform having a hardware processor and a system memory storing a software code. The hardware processor executes the software code to receive an editing file including edits to media content, the edits being based on a compressed representation of the media content and having a first data format. The software code also obtains cross-referencing data that maps a timecode data of the compressed representation of the media content to segments of an uncompressed representation of the media content, and transforms the editing file to a conformation file including the edits in a second data format based on the cross-referencing data. The conformation file enables rendering of an edited version of the media content including the edits.

20 Claims, 4 Drawing Sheets

```
                            final-digiconf
<digiconf xmlns:aaf="http://www.aafassociation.org/aafx/v1.1/20090617"
xmlns:digi="http://dtva/digi" xmlns:this="http://www.aafassociation.org/this"
version="6.5">
  <Sequence length="360">
    <TimeSlice length="12">
      <File length="12" take="L1"
file="/USA_DB/jobs/digiconf-unknown-clip/scene-RDDigi_testmediaA"/>
    </TimeSlice>
    <VideoWipe length="10" swapSources="0" SMPTEWipeNumber="1">
      <ConstantValueFunction name="softness" value="10.0"/>
      <ConstantValueFunction name="positionX" value="0"/>
      <ConstantValueFunction name="positionY" value="0"/>
      <VaryingValueFunction name="level" value="-0.0123456790123 0.0 1.01234567901
100.0" interpolation="LINEAR"/>
      <TimeSlice length="10" start="12">
        <File length="22" take="L1"
file="/USA_DB/jobs/digiconf-unknown-clip/scene-RDDigi_testmediaA"/>
      </TimeSlice>
      <TimeSlice length="10">
        <File length="10" take="L1"
file="/USA_DB/jobs/digiconf-unknown-clip/scene-RDDigi_testmediaB"/>
      </TimeSlice>
    </VideoWipe>
    <TimeSlice length="2" start="10">
      <File length="12" take="L1"
file="/USA_DB/jobs/digiconf-unknown-clip/scene-RDDigi_testmediaB"/>
    </TimeSlice>
    <VideoWipe length="10" swapSources="0" SMPTEWipeNumber="2">
      <ConstantValueFunction name="softness" value="10.0"/>
      <ConstantValueFunction name="positionX" value="0"/>
      <ConstantValueFunction name="positionY" value="0"/>
      <VaryingValueFunction name="level" value="-0.0123456790123 0.0 1.01234567901
100.0" interpolation="LINEAR"/>
      <TimeSlice length="10" start="12">
        <File length="22" take="L1"
file="/USA_DB/jobs/digiconf-unknown-clip/scene-RDDigi_testmediaB"/>
      </TimeSlice>
      <TimeSlice length="10">
        <File length="10" take="L1"
file="/USA_DB/jobs/digiconf-unknown-clip/scene-RDDigi_testmediaA"/>
      </TimeSlice>
    </VideoWipe>
    <TimeSlice length="2" start="10">
      <File length="12" take="L1"
file="/USA_DB/jobs/digiconf-unknown-clip/scene-RDDigi_testmediaA"/>
    </TimeSlice>
    <VideoWipe length="10" swapSources="0" SMPTEWipeNumber="21">
      <ConstantValueFunction name="softness" value="10.0"/>
```

DIGITAL CONFORMATION OF MEDIA CONTENT

RELATED APPLICATIONS

The present application claims the benefit of and priority to a Provisional Patent Application Ser. No. 62/622,058, filed Jan. 25, 2018, and titled "Digital Conformation of Media Content," which is hereby incorporated fully by reference into the present application.

BACKGROUND

Media content, such as animation for example, is often produced in multiple versions that may differ in resolution. For instance, when making edits to animation sequences from finished frames of animation, editors typically use compressed, proxy video clips, in place of the original uncompressed animation frames. The compressed proxy media content is utilized because working with the original uncompressed media content in editorial applications is typically too computationally intensive.

Existing editorial applications for media content such as animation may produce a final render by applying the edits made to the compressed media content to higher resolution versions of that content, but require the participation of a human editor in an interactive process to do so. Moreover, and unfortunately, existing editorial applications do not have features enabling the application of edits made to proxy video clips of animation back to the original uncompressed frames of animation.

SUMMARY

There are provided systems and methods for performing digital conformation of media content, substantially as shown in or described in connection with at least one of the figures, and as set forth more completely in the claims.

BRIEF DESCRIPTION OF THE DRAWINGS

FIG. 4 shows a portion of an exemplary conformation file including edits transformed from a first data format to a second data format.

DETAILED DESCRIPTION

Figure 1:
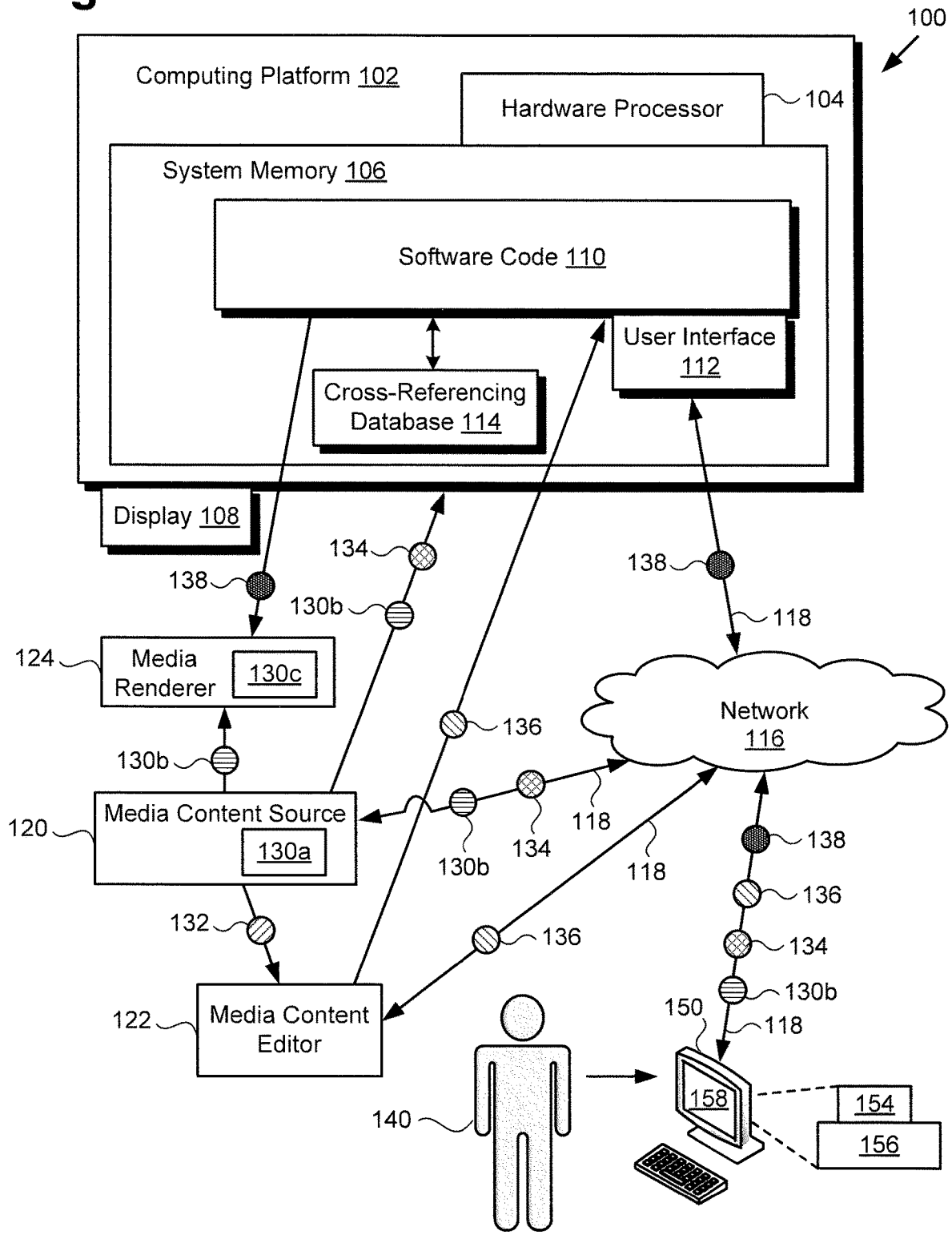
FIG. 1 shows a diagram of an exemplary system for performing digital conformation of media content, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses a solution for digitally conforming media content that overcomes the drawbacks and deficiencies in the conventional art. The present solution includes receiving an editing file containing edits to media content that are made based on a compressed representation of the media content and having a s first data format. The present solution also includes obtaining cross-referencing data that maps a timecode data of the compressed representation of the media content to segments of an uncompressed representation of the media content. The first data format may for example be an Advanced Authoring Format (AAF), an Open Media Frameword (OMF) format, or any other devised format.

The editing file containing the edits in the first data format is then transformed to a conformation file including the same edits in a second data format, based on the cross-referencing data. The second data format of the edits in the conformation file is advantageously human readable and modifiable by a user of a system implementing the present solution. The conformation file enables rendering of an edited version of the media content that includes the edits made to the compressed representation of the media content. Moreover, the conformation file may be advantageously utilized to perform batch rendering of the edited version of the media content, using a render farm, for example.

FIG. 1 shows a diagram of an exemplary system for performing digital conformation of media content, according to one implementation. As shown in FIG. 1, media content conformation system 100 includes computing platform 102 having hardware processor 104, system memory 106 implemented as a non-transitory storage device, and display 108. According to the present exemplary implementation, system memory 106 stores cross-referencing database 114, and software code 110 providing user interface 112.

As further shown in FIG. 1, media content conformation system 100 is implemented within a use environment including communication network 116 having network communication links 118, and user system 150 including user system hardware processor 154, user system memory 156, and display 158. The use environment in which media content conformation system 100 is implemented may further include media content source 120 of media content 130*a*, media content editor 122, and media renderer 124. Also shown in FIG. 1 are compressed representation 132 of media content 130*a*, uncompressed representation 130*b* of media content 130*a*, edited version 130*c* of media content 130*a*, cross-referencing data 134, editing file 136, conformation file 138 produced using software code 110, and system user 140.

It is noted that, in some implementations, media renderer 124 may take the form of a render farm. As defined for the purposes of the present application, the term "render farm" has its generally accepted meaning in the art. That is to say, as defined herein, a render farm may be a high-performance computer system, such as a computer cluster or cloud based computer system, specifically configured to render computer-generated imagery.

It is further noted that display 108, as well as display 158 of user system 150, may be implemented as a liquid crystal display (LCD), a light-emitting diode (LED) display, an organic light-emitting diode (OLED) display, or another suitable display screen that performs a physical transformation of signals to light. It is also noted that, although the present application refers to software code 110 as being stored in system memory 106 for conceptual clarity, more generally, system memory 106 may take the form of any computer-readable non-transitory storage medium.

The expression "computer-readable non-transitory storage medium," as used in the present application, refers to any medium, excluding a carrier wave or other transitory signal, capable of providing instructions to hardware processor 104 of computing platform 102 or to user system hardware processor 154 of user system 150. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is also noted that although FIG. 1 depicts software code 110 as being stored in its entirety in system memory 106, that representation is also provided merely as an aid to conceptual clarity. More generally, media content conformation system 100 may include one or more computing platforms 102, such as computer servers for example, which may be co-located, or may form an interactively linked but distributed system, such as a cloud based system, for instance.

As a result, hardware processor 104 and system memory 106 may correspond to distributed processor and memory resources within media content conformation system 100. Thus, it is to be understood that various features of software code 110, such as one or more of the features described below by reference to FIG. 2, may be stored, and executed using the distributed memory and processor resources of media content conformation system 100.

According to the exemplary implementation shown by FIG. 1, system user 140 may utilize user system 150 to interact with media content conformation system 100 over communication network 116. In one such implementation, media content conformation system 100 may correspond to one or more web servers, accessible over a packet-switched network such as the Internet, for example. Alternatively, media content conformation system 100 may correspond to one or more computer servers supporting a local area network (LAN), or included in another type of limited distribution network.

Although user system 150 is shown as a desktop computer in FIG. 1, that representation is also provided merely as an example. More generally, user system 150 may be any suitable mobile or stationary computing device or system that implements data processing capabilities sufficient to support a user interface and connections to communication network 116, as well as to implement the functionality ascribed to user system 150 herein. For example, in other implementations, user system 150 may take the form of a laptop computer, tablet computer, or smartphone, for example. System user 140 may utilize user system 150 to interact with media content conformation system 100 to edit or otherwise modify conformation file 138 through user interface 112.

It is noted that, in various implementations, conformation file 138, when produced using software code 110, may be stored in system memory 106 and copied to non-volatile storage (not shown in FIG. 1). Alternatively, or in addition, as shown in FIG. 1, in some implementations, conformation file 138 may be sent to user system 150 including display 158, for example by being transferred via network communication links 118 of communication network 116.

In some implementations, software code 110 may be utilized directly by user system 150. For example, software code 110 may be transferred to user system memory 156, via download over communication network 116, for example, or via transfer using a computer-readable non-transitory medium, such as an optical disc or FLASH drive. In those implementations, software code 110 may be persistently stored on user system memory 156, and may be executed locally on user system 150 by user system hardware processor 154.

Figure 2:
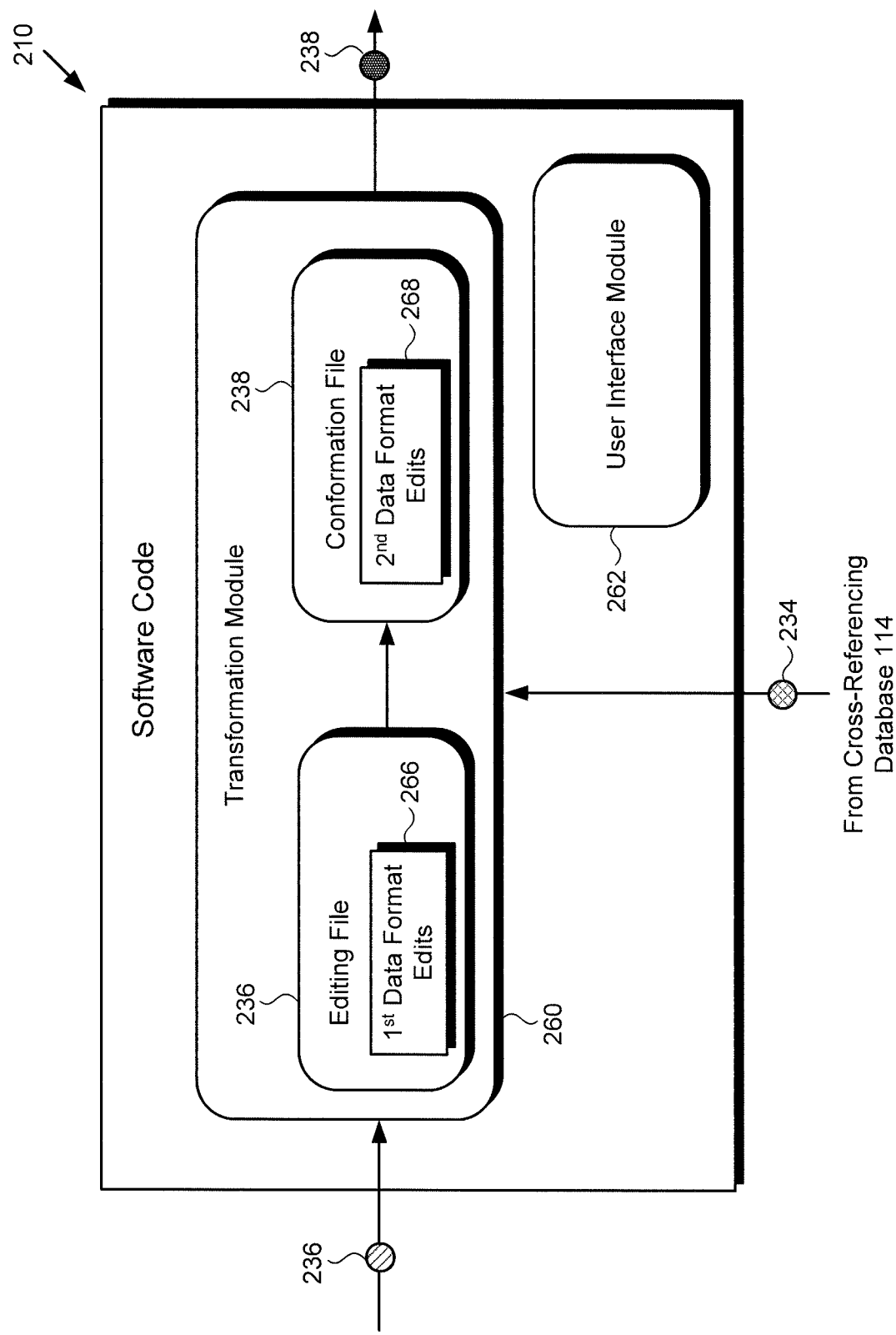
FIG. 2 shows an exemplary diagram of a software code suitable for execution by a hardware processor of the system shown by FIG. 1, according to one implementation.

FIG. 2 shows exemplary software code 210 suitable for execution by hardware processor 104 of computing platform 102 or by user system hardware processor 154 of user system 150, in FIG. 1, according to one implementation. As shown in FIG. 2, software code 210 may include transformation module 260, and user interface module 262 configured to support user interface 112. Also shown in FIG. 2 are cross-referencing data 234 received from cross-referencing database 114, in FIG. 1, editing file 236 including first data format edits 266, and conformation file 238 including second data format edits 268.

Cross-referencing data 234, editing file 236, and conformation file 238 correspond respectively in general to cross-referencing data 134, editing file 136, and conformation file 138, in FIG. 1, and those corresponding features may share any of the characteristics attributed to either corresponding feature by the present disclosure. In addition, software code 210 corresponds in general to software code 110, and those corresponding features may share any of the characteristics attributed to either corresponding feature by the present disclosure. That is to say, like software code 210, software code 110 may include features corresponding respectively to transformation module 260 and user interface module 262.

Figure 3:
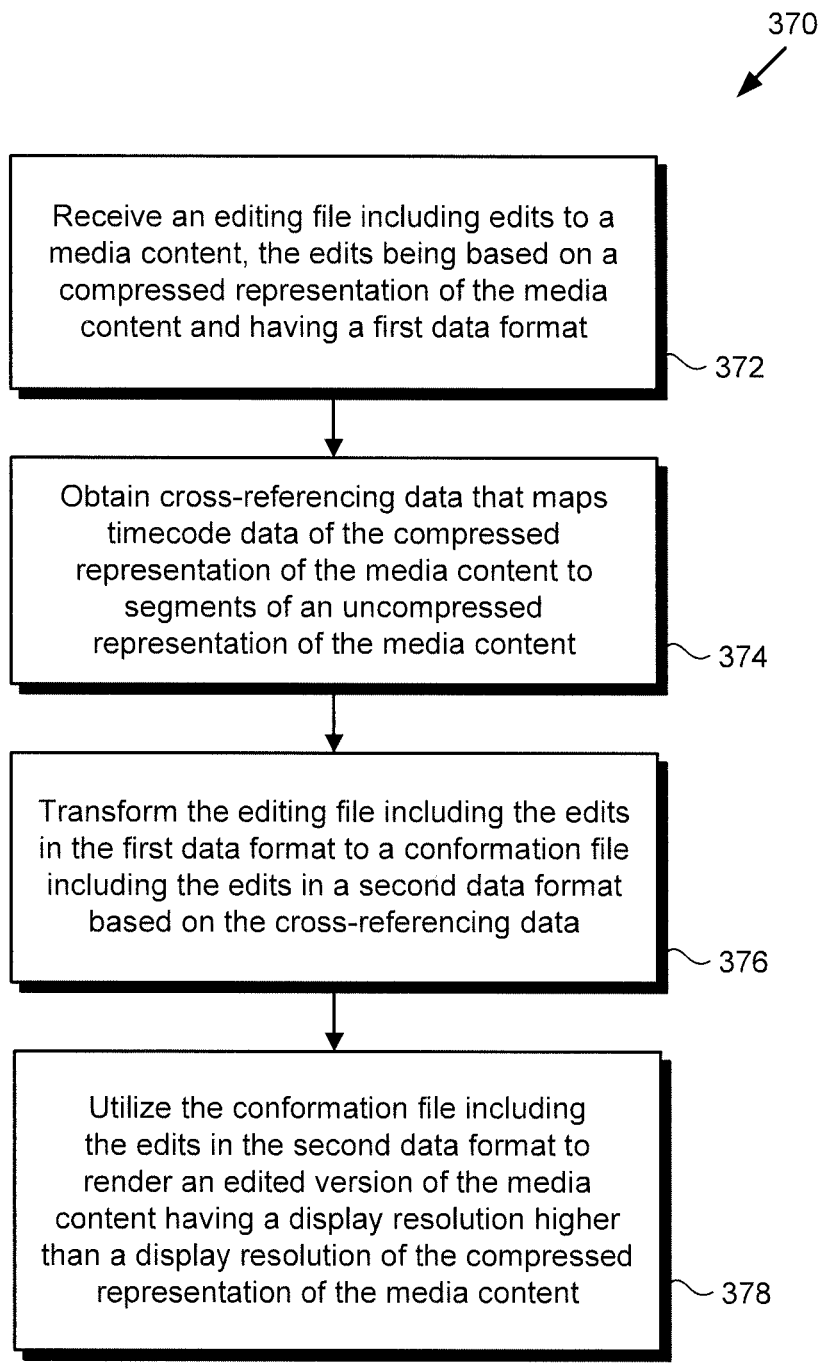
FIG. 3 shows a flowchart presenting an exemplary method for performing digital conformation of media content, according to one implementation.

The functionality of software code 110/210 will be further described by reference to FIG. 3 in combination with FIGS. 1, 2, and 4. FIG. 3 shows flowchart 370 presenting an exemplary method for use by a system, such as media content conformation system 100 or user system 150 in FIG. 1, to perform digital conformation of media content. With respect to the method outlined in FIG. 3, it is noted that certain details and features have been left out of flowchart 370 in order not to obscure the discussion of the inventive features in the present application.

FIG. 4 shows exemplary second data format edits 468 included in conformation file 138/238 as Extensible Markup Language (XML) formatted edits. Second data format edits 468 correspond in general to second data format edits 268, in FIG. 2, and those corresponding features may share any of the characteristics attributed to either corresponding feature by the present disclosure. Thus, like second data format edits 468, second data format edits 268 may be human readable edits capable of being modified by system user 140.

Referring now to FIG. 3 in combination with FIGS. 1 and 2, flowchart 370 begins with receiving editing file 136/236 including first data format edits 266 to media content 130*a*, first data format edits 266 being based on compressed representation 132 of media content 130*a* (action 372). It is noted that the inventive principles disclosed in the present application are applicable to a wide variety of media content types, including many types of audio-visual content. However, for exemplary purposes, and in the interests of conceptual clarity, the method of flowchart 370 will be described by reference to a specific use case in which media content 130*a* takes the form of an animation sequence (hereinafter "animation sequence 130*a*").

It is noted that when edits are applied to animation sequence 130a by an editing system, software, or other editing resource corresponding to media content editor 122, media content editor 122 may work from compressed representation 132 of animation sequence 130a that includes proxy video of animation sequence 130a in place of original animation sequence 130a. Thus, editing file 136/236 may be generated by media content editor 122 based on compressed representation 132 of animation sequence 130a provided by media content source 120.

Editing file 136/236 may include first data format edits 266 in the form of timecode data including cuts in animation sequence 130a, i.e., where each scene begins and ends, as well as transition effects, such as cross-fades and circle wipes, for example. Moreover, the timecode data included in first data format edits 266 may uniquely identify each scene using identifying data contained in compressed representation 132 of animation sequence 130a. It is noted that, as defined for the purposes of the present application, a "scene" refers to a sequence of frames within audio-visual content that is captured from a unique camera perspective without cuts or other cinematic transitions. For example, first data format edits 266 may be an edit decision list (EDL) used in the post-production process of film editing and video editing, where EDL contains an ordered list of reel and timecode data representing where each video clip can be obtained in order to conform the final cut. Editing file 136/236 may include first data format edits 266 in a data format, such as Advanced Authoring Format (AAF), or as an Open Media Framework (OMF) formatted file. That is to say, in some implementations, first data format edits 266 may be one of AAF and OMF formatted edits.

In some implementations, as shown in FIG. 1, editing file 136/236 may be received by media content conformation system 100 from content editor 122, either directly or via communication network 116 and network communication links 118. Editing file 136/236 including first data format edits 266 may be received by transformation module 260 of software code 110/210, executed by hardware processor 104 of computing platform 102.

Alternatively, and as noted above, in some implementations, software code 110/210 may reside on user system memory 156 and be executed by user system hardware processor 154. In those implementations, editing file 136/236 may be received by user system 150 via communication network 116 and network communication links 118. That is to say, in those implementations, editing file 136/236 including first data format edits 266 may be received by transformation module 260 of software code 110/210, executed by user system hardware processor 154 of user system 150.

Flowchart 370 continues with obtaining cross-referencing data 134/234 that maps a timecode data of compressed representation 132 of animation sequence 130a to segments of uncompressed representation 130b of animation sequence 130a (action 374). It is noted that uncompressed version 130b of animation sequence 130a may be original uncompressed animation sequence 130a itself, for example.

As noted above, editing file 136/236 may include first data format edits 266 in the form of timecode data that may uniquely identify each scene using identifying data contained in compressed representation 132 of animation sequence 130a. Cross-referencing data 134/234 may map each timecode based on first data format edits 266 to a respective segment of animation sequence 130, which may take the form of a respective single frame of animation sequence 130.

In some implementations, as shown in FIG. 1, cross-referencing data 134/234 may be received by media content conformation system 100 from media content source 120, such as an owner or creator of animation sequence 130, either directly or via communication network 116 and network communication links 118. When received by media content conformation system 100, cross referencing data 134/234 may be stored in cross-referencing database 114 of system memory 106. Cross referencing data 134/234 may be obtained from cross-referencing database 114 by transformation module 260 of software code 110/210, executed by hardware processor 104 of computing platform 102.

Alternatively, and as noted above, in some implementations software code 110/210 may reside on user system memory 156 and be executed by user system hardware processor 154. In those implementations, cross referencing data 134/234 may be obtained from cross-referencing database 114, via communication network 116 and network communication links 118, by transformation module 260 of software code 110/210, executed by user system hardware processor 154 of user system 150.

Flowchart 370 continues with transforming editing file 136/236 including first data format edits 266 to conformation file 138/238 including second data format edits 238 based on cross-referencing data 134/234 (action 376). It is noted that first data format edits 266 and second data format edits 268 are substantially the same edits expressed using different data formats. Transformation of editing file 136/236 including first data format edits 266 to conformation file 138/238 including second data format edits 238 based on cross-referencing data 134/234 may be performed by transformation module 260 of software code 110/210, executed by hardware processor 104 of computing platform 102, or by user hardware processor 154 of user system 150.

As noted by above, compressed representation 132 of animation sequence 130a may include unique identifiers for each scene of animation sequence 130a. Cross-referencing database 114 includes cross-referencing data 134/234 that cross-references those unique identifiers to the frames of animation sequence 130a in its original uncompressed form. Transformation module 260 of software code 110/210, when executed by hardware processor 104 or user system hardware processor 154, utilizes cross-referencing data 134/234 to transform first data format edits 266 applied to compressed representation 132 of animation sequence 130a to corresponding second data format edits 268 suitable for application to substantially any uncompressed representation 130b of animation sequence 130a. Thus transformation of editing file 136/236 to conformation file 138/238 by software code 110/210 results in transformation of first data format edits 266 to second data format edits 268.

Second data format edits 268 of conformation file 138/238 may be in any suitable data format that is machine readable, human readable, and editable or otherwise modifiable by system user 140. For example, as shown in FIG. 4, conformation file 138/238 may be an XML file including XML edits 468. That is to say, in some implementations, the second data format of conformation file 138/238 may be XML or another machine-readable, as well as human editable and human-readable data format. In some implementations, a user of media content conformation system 100/250, such as system user 140 in FIG. 1, may change, such as add to, delete from, or modify second data format edits 268 of conformation file 138/238, via user interface 112 supported by user interface module 262 of software code 110/210.

Flowchart 370 can conclude with utilizing conformation file 138/238 including second data format edits 268 to render edited version 130c of animation sequence 130a having a display resolution higher than the display resolution of compressed to representation 132 of animation sequence 130a (action 378). Thus, conformation file 138/238 enables use of second data format edits 268 corresponding to first data format edits 266 generated based on a lower display resolution compressed representation 132 of animation sequence 130a, to edit uncompressed representation 130b of animation sequence 130a. As a result, conformation file 138/238 enables the rendering of a higher display resolution edited version 130c of animation sequence 130a that includes the edits applied by second data format edits 268. Further, in other implementations, conformation file 138/238 may enable producing media formatted at the same resolution but uncompressed rather than compressed, media formatted for different display aspect ratios, e.g. one edit conformed to produce both 1.33 aspect-ratio DVDs or 1.66 aspect ratio letter-boxed DVD, or media for different languages by post-editing the conformation file to substitute imagery with text in different languages.

Moreover, in some implementations, conformation file 138/238 may be used to render edited version 130c of animation sequence 130a in a display resolution that is higher than the display resolution of uncompressed representation 130b of animation sequence 130a. For example, in some implementations, where uncompressed representation 130b of animation sequence 130a includes standard-definition (SD) video, edited version 130c of animation sequence 130a may be rendered by media renderer 124 as high-definition (HD) video, such as 1K video for instance. As another example, where uncompressed representation 130b of animation sequence 130a includes SD video or HD video, edited version 130c of animation sequence 130a may be rendered by media renderer 124 as Ultra-HD video, such as 2K or 4K video for instance.

In addition, it is noted that conformation file 138/238 can be used to advantageously enable rendering of edited version 130c of animation sequence 130a, or any suitable media content 130a, using batch processing. For example, in some implementations, and as noted above, media renderer 124 may take the form of a render farm, and edited version 130c of animation sequence/media content 130a may be batch processed by render farm 124.

In some implementations, conformation file 138/238 may be utilized to render edited version 130c of animation sequence/media content 130a on a display, such as display 108 or display 158 of user system 150. For example, and as shown in FIG. 1, in some implementations, uncompressed representation 130b of animation sequence/media content 130a may be received by media content conformation system 100 from media content source 120, such as an owner or creator of animation sequence/media content 130a, either directly or via communication network 116 and network communication links 118. When received by media content conformation system 100, uncompressed representation 130b of animation sequence/media content 130a may be stored in system memory 106. Second data format edits 268 included in conformation file 138/238 can then be applied to uncompressed representation 130b of animation sequence/media content 130a to produce edited version 130c of animation sequence/media content 130a, which may be rendered on display 108.

Alternatively, and as also shown in FIG. 1, in some implementations, uncompressed representation 130b of animation sequence/media content 130a may be received by user system 150 via communication network 116 and network communication links 118. When received by user system 150, uncompressed representation 130b of animation sequence/media content 130a may be stored in user system memory 156. Second data format edits 268 included in conformation file 138/238 can then be applied to uncompressed representation 130b of animation sequence/media content 130a to produce edited version 130c of animation sequence/media content 130a, which may be rendered on display 158.

Thus, the present application discloses a solution for digitally conforming media content. The present solution includes receiving an editing file containing edits to media content that are made based on a compressed representation of the media content and having a first data format. Cross-referencing data that maps a timecode data of the compressed representation of the media content to segments of an uncompressed representation of the media content is obtained and used to transform the editing file containing the edits in the first data format to a conformation file including the same edits in a second data format that is human readable and modifiable by a user of a system implementing the present solution. The conformation file generated using the present solution advantageously enables rendering of an edited version of the media content that includes the edits made to the compressed representation of the media content and has a display resolution higher than a display resolution of the compressed representation of the media content. The conformation file generated using the present solution may be further advantageously utilized to perform batch rendering of the edited version of the media content.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A media content conformation system comprising:
a computing platform including a hardware processor and a system memory;
a software code stored in the system memory;
the hardware processor configured to execute the software code to:
receive an editing file including a plurality of edits to a media content, the plurality of edits being based on a compressed representation of the media content and having a first data format;
obtain cross-referencing data that maps a timecode data of the compressed representation of the media content to a plurality of segments of an uncompressed representation of the media content; and
transform the editing file including the plurality of edits in the first data format to a conformation file including the plurality of edits in a second data format based on the cross-referencing data thereby transforming the plurality of edits from the first data format to the second data format based on the cross-referencing data;

wherein the conformation file enables rendering of an edited version of the media content including the plurality of edits, and wherein the edited version of the media content has a display resolution higher than a display resolution of the uncompressed representation of the media content.

2. The media content conformation system of claim 1, further comprising a display,
wherein the hardware processor is further configured to execute the software code to utilize the conformation file to render the edited version of the media content on the display.

3. The media content conformation system of claim 1, wherein the conformation file enables batch rendering of the edited version of the media content using a render farm comprising a computer cluster or cloud based computer system specifically configured to render computer-generated imagery.

4. The media content conformation system of claim 1, wherein the uncompressed representation of the media content comprises an animation sequence, and wherein the compressed representation of the media content comprises a video of the animation sequence.

5. The media content conformation system of claim 1, wherein the first data format is one of an Advanced Authoring Format (AAF) or an Open Media Framework (OMF) format.

6. The media content conformation system of claim 1, wherein the plurality of edits transformed to the second data format are human readable and modifiable by a user of the media content conformation system.

7. The media content conformation system of claim 1, wherein an aspect ratio of the edited version of the media content is different from an aspect ratio of the uncompressed representation of the media content.

8. A method for use by a media content conformation system including a computing platform having a hardware processor and a system memory storing a software code, the method comprising:
receiving, using the hardware processor, an editing file including a plurality of edits to a media content, the plurality of edits being based on a compressed representation of the media content and having a first data format;
obtaining, using the hardware processor, cross-referencing data that maps a timecode data of the compressed representation of the media content to a plurality of segments of an uncompressed representation of the media content; and
transforming, using the hardware processor, the editing file including the plurality of edits in the first data format to a conformation file including the plurality of edits in a second data format based on the cross-referencing data thereby transforming the plurality of edits from the first data format to the second data format based on the cross-referencing data;
wherein the conformation file enables rendering of an edited version of the media content including the plurality of edits, and wherein the edited version of the media content has a display resolution higher than a display resolution of the uncompressed representation of the media content.

9. The method of claim 8, further comprising utilizing the conformation file to render the edited version of the media content.

10. The method of claim 8, wherein the conformation file enables batch rendering of the edited version of the media content using a render farm comprising a computer cluster or cloud based computer system specifically configured to render computer-generated imagery.

11. The method of claim 8, wherein the uncompressed representation of the media content comprises an animation sequence, and wherein the compressed representation of the media content comprises a video of the animation sequence.

12. The method of claim 8, wherein the first data format is one of an Advanced Authoring Format (AAF) or an Open Media Framework (OMF) format.

13. The method of claim 8, wherein the plurality of edits transformed to the second data format are human readable and modifiable by a user of the media content conformation system.

14. The method of claim 8, wherein an aspect ratio of the edited version of the media content is different from an aspect ratio of the uncompressed representation of the media content.

15. A media content conformation system comprising:
a computing platform including a hardware processor and a system memory;
a software code stored in the system memory;
the hardware processor configured to execute the software code to:
receive an editing file including a plurality of edits to a media content, the plurality of edits being based on a compressed representation of the media content and having a human unreadable data format;
obtain cross-referencing data that maps a timecode data of the compressed representation of the media content to a plurality of segments of an uncompressed representation of the media content; and
transform the editing file that includes the plurality of edits in the human unreadable data format to a conformation file that includes the plurality of edits in a human readable format based on the cross-referencing data;
wherein the conformation file enables rendering of an edited version of the media content including the plurality of edits, and wherein the edited version of the media content has a display resolution higher than a display resolution of the uncompressed representation of the media content.

16. The media content conformation system of claim 15, further comprising a display,
wherein the hardware processor is further configured to execute the software code to utilize the conformation file to render the edited version of the media content on the display.

17. The media content conformation system of claim 15, wherein the conformation file enables batch rendering of the edited version of the media content using a render farm comprising a computer cluster or cloud based computer system specifically configured to render computer-generated imagery.

18. The media content conformation system of claim 15, wherein the uncompressed representation of the media content comprises an animation sequence, and wherein the compressed representation of the media content comprises a video of the animation sequence.

19. The media content conformation system of claim 15, wherein the human unreadable data format is one of an Advanced Authoring Format (AAF) or an Open Media Framework (OMF) format.

20. The media content conformation system of claim 15, wherein an aspect ratio of the edited version of the media content is different from an aspect ratio of the uncompressed representation of the media content.

\* \* \* \* \*